(12) United States Patent
Karpa

(10) Patent No.: US 7,941,658 B2
(45) Date of Patent: May 10, 2011

(54) COMPUTER SYSTEM AND METHOD FOR UPDATING PROGRAM CODE

(75) Inventor: Wolfgang Karpa, Delbrück (DE)

(73) Assignee: Fujitsu Siemens Computers GmbH, Munich (DE)

( * ) Notice: Subject to any disclaimer, the term of this patent is extended or adjusted under 35 U.S.C. 154(b) by 884 days.

(21) Appl. No.: 11/846,269

(22) Filed: Aug. 28, 2007

(65) Prior Publication Data

US 2008/0072030 A1   Mar. 20, 2008

(30) Foreign Application Priority Data

Sep. 18, 2006   (DE) .......................... 10 2006 043 636

(51) Int. Cl.
G06F 15/177 (2006.01)

(52) U.S. Cl. ................................. 713/2; 713/1; 713/100

(58) Field of Classification Search .................. 713/1, 2, 713/100

See application file for complete search history.

(56) References Cited

U.S. PATENT DOCUMENTS

| | | | |
|---|---|---|---|
| 5,388,267 A * | 2/1995 | Chan et al. | 713/2 |
| 5,579,522 A * | 11/1996 | Christeson et al. | 713/2 |
| 5,878,256 A * | 3/1999 | Bealkowski et al. | 713/2 |
| 6,223,336 B1 | 4/2001 | Tojima | |
| 6,308,265 B1 * | 10/2001 | Miller | 713/2 |
| 6,421,792 B1 * | 7/2002 | Cromer et al. | 714/36 |
| 6,625,730 B1 * | 9/2003 | Angelo et al. | 713/2 |
| 2002/0073304 A1 * | 6/2002 | Marsh et al. | 713/1 |
| 2005/0229173 A1 | 10/2005 | Mihm et al. | |
| 2006/0184781 A1 | 8/2006 | Inada et al. | |

FOREIGN PATENT DOCUMENTS

| | | |
|---|---|---|
| DE | 19525105 A1 | 1/1996 |
| DE | 10346278 A1 | 5/2005 |
| WO | 2005059747 A2 | 6/2005 |

* cited by examiner

Primary Examiner — Dennis M Butler
(74) Attorney, Agent, or Firm — Edell, Shapiro & Finnan, LLC

(57) ABSTRACT

A computer system includes: a processor for executing a program code, a first non-volatile memory for storing a first program code for starting the computer system, the first non-volatile memory being functionally connected to the processor, and a system monitoring module which is functionally connected to the processor and to the first non-volatile memory and is configured to monitor the computer system for the occurrence of a predetermined condition. The system monitoring module includes a second non-volatile memory for storing a second program code for starting the computer system and is configured to copy the second program code from the second non-volatile memory into the first non-volatile memory when the predetermined condition occurs, so that the second program code replaces the first program code and is available for subsequent starting of the computer system.

21 Claims, 2 Drawing Sheets

US 7,941,658 B2

COMPUTER SYSTEM AND METHOD FOR UPDATING PROGRAM CODE

CROSS REFERENCE TO RELATED APPLICATIONS

This application claims priority under 35 U.S.C. §119 to Application No. DE 102006043636.9 filed on Sep. 18, 2006, entitled "Computer System and Method for Updating Program Code," the entire contents of which are hereby incorporated by reference.

BACKGROUND

Known computer systems include a processor for executing program code, a non-volatile memory for storing program code for starting the computer system, and a system monitoring module for monitoring the computer system for the occurrence of a predetermined condition. Server computers, in particular, often have a system monitoring module (also referred to as a Baseboard Management Controller (BMC)) which is used to monitor the correct operation of the computer system being monitored. This makes it possible to rapidly and reliably detect errors in the computer system and thus achieve a high level of reliability of the relevant computer system.

The so-called BIOS (Basic Input Output System) which contains program code for starting the computer system is a particularly critical component of computer systems. If an error occurs during execution of the BIOS program code, the computer system can no longer operate. In addition, such an error cannot be rectified, in particular, by resetting the computer system.

Errors in the BIOS program can arise, inter alia, while the latter is being updated, for example if an updating operation is not successfully completed or a BIOS version which is not suitable for the respective computer system is inadvertently stored. Subsequent starting of the computer system, and thus execution of the defective BIOS program code, generally results in an error which can be rectified only using relatively complicated measures.

For example, it is possible to replace a memory module, which contains the BIOS program code, with another memory module containing the correct BIOS program code. Alternatively, it is also known, during system starting, to provide a user of the computer system with the opportunity to load new program code for starting the computer system, for example using a so-called USB memory stick.

However, both methods are relatively complicated and, in particular, prevent remote maintenance of the computer system. Especially in the case of server computers in which a high level of reliability of the computer system is important and which are often not set up in the immediate reach of a user. Therefore, there is a need for improved computer systems and methods which allow program code for starting the computer system to be updated in a simple and reliable manner. In particular, updating should not require any manual intervention in the computer system and should preferably be able to be carried out remotely.

SUMMARY

Described herein is a computer system comprising a processor to execute a program code, a first non-volatile memory to store a first program code for starting the computer system, the first non-volatile memory being functionally connected to the processor, and a system monitoring module functionally connected to the processor and to the first non-volatile memory and is configured to monitor the computer system for the occurrence of a predetermined condition. A method to update a program code for starting a computer system and a method of operating a computer system are also described herein.

The described computer system and method provide improvements such that the program code for starting the computer system can be updated in a simple and reliable manner. In particular, updating the program code does not require any manual intervention in the computer system and can be carried out remotely (e.g., via a remote maintenance system over a network).

The system monitoring module of the described computer system comprises a second non-volatile memory for storing a second program code for starting the computer system, and the system monitoring module is configured to copy the second program code from the second non-volatile memory into the first non-volatile memory in the event that the predetermined condition occurs, so that the second program code replaces the first program code and is available for subsequent starting of the computer system.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The computer system and method will be explained in more detail below using an exemplary embodiment and with reference to the drawings, in which.

DETAILED DESCRIPTION

Figure 1:
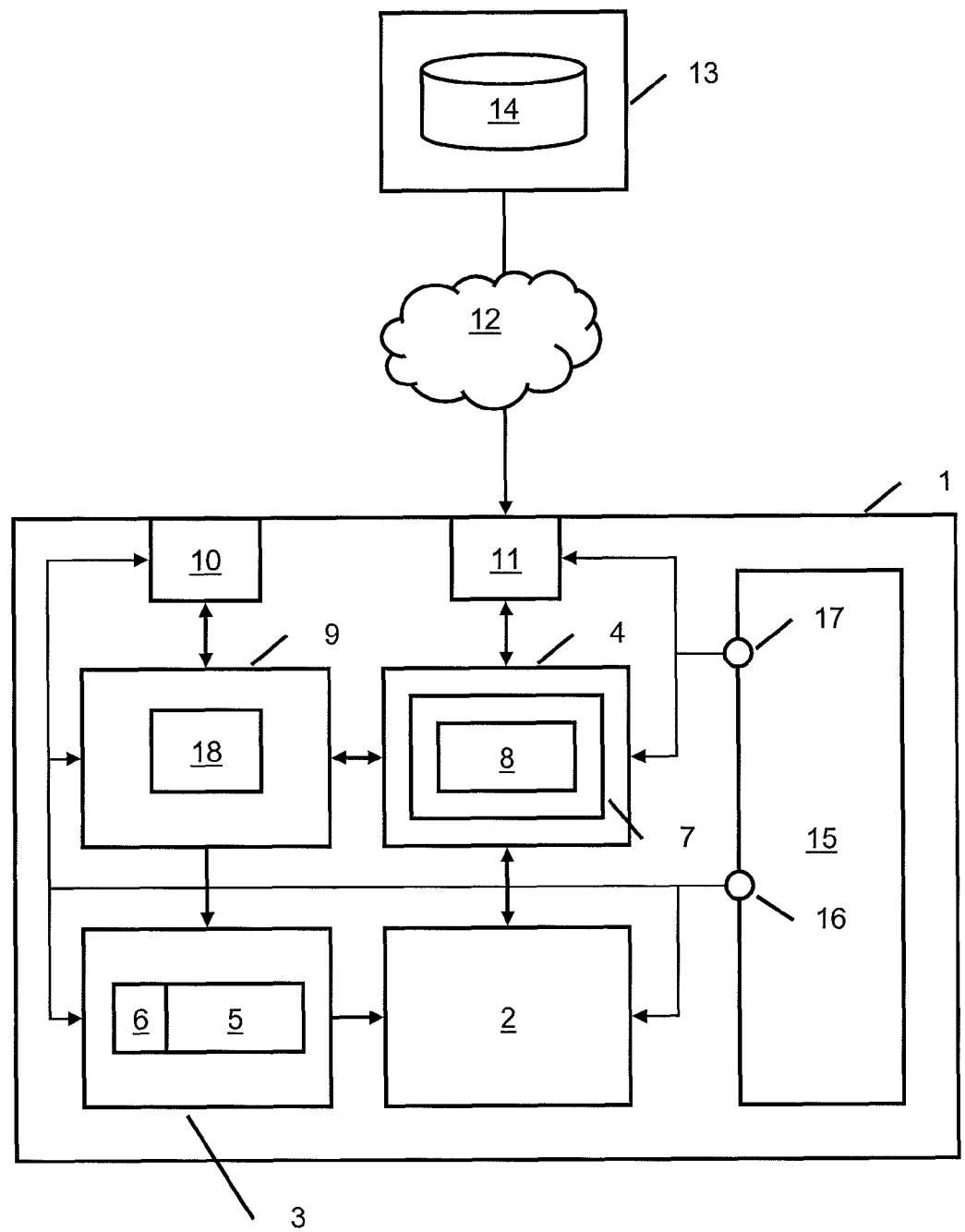
FIG. 1 shows a diagrammatic illustration of a computer system.

According to the computer system described herein, a system monitoring module of the computer system comprises a second program code for starting the computer system, the second program code being able to replace a first program code of the computer system in the event of an error, for example. This ensures that functional program code for starting the computer system is always available without the need to manually intervene in the computer system for this purpose.

According to one embodiment, a first non-volatile memory of the computer system comprises a memory area which cannot be changed and stores a program code for a bootblack. According to another embodiment, the program code of the bootblock comprises an integrity check for the first program code. In the event that the integrity check is negative, the second program code is copied into the first non-volatile memory and then is executed.

Dividing the first non-volatile memory into a memory area which cannot be changed and is intended for a bootblack and a memory area which can be changed and is intended for the first program code makes it possible to carry out an integrity check for the first program code in response to the computer system being started. Depending on whether or not the integrity check is successful, either the first program code can then be executed or the second program code can be copied into the first non-volatile memory and subsequently executed.

Optionally, the first and/or second non-volatile memory store(s) version information for the first and second program codes. In the event of the second program code being more up-to-date than the first program code, the system monitoring module copies the second program code into the first non-volatile memory in response to the computer system being started.

Automatically copying up-to-date program code from the second non-volatile memory into the first non-volatile memory makes it possible to ensure that the computer system respectively uses the most up-to-date available version of the program code for starting the computer system.

Optionally, the system monitoring module is functionally connected to a network interface and is configured to store program code, which is received via the network interface, in the second non-volatile memory as a second program code. Coupling the system monitoring module to a network interface makes it possible to maintain the computer system remotely.

According to another refinement, the computer system comprises a power supply unit operable in a standby mode, at least the system monitoring module and the network interface being supplied with an operating voltage in the standby mode, so that the second program code can be updated in the standby mode. The program code for starting the computer system can thus be updated even when the computer system is switched off.

A method for updating program code for starting a computer system is also described herein. In a computer system comprising a processor, a first non-volatile memory and a system monitoring module including a second non-volatile memory, the method includes:

the processor executing program code of a bootblack from the first non-volatile memory;

determining whether a predetermined condition has been satisfied;

the processor executing first program code for starting the computer system from the first non-volatile memory if the predetermined condition has not been satisfied; and copying second program code for starting the computer from the second non-volatile memory into the first non-volatile memory and executing the second program code if the predetermined condition has been satisfied.

The method ensures that one of the stored program codes for starting the computer system is always executed.

According to a refinement, a recovery indicator is checked in the checking step, and the system monitoring module sets the recovery indicator if the computer system is not successfully started.

In the event that the system monitoring module detects that the computer system could not be successfully started, the second program code is caused to be copied from the second non-volatile memory into the first non-volatile memory as a result of the recovery indicator being checked when the computer system is subsequently restarted, so that the computer system can then be successfully restarted.

According to another advantageous refinement, the method additionally comprises the following steps:

transmitting updated program code to the system monitoring module, storing the updated program code in the system monitoring module as second program code, and setting the recovery indicator.

The additional steps cause the recovery indicator to be set when updating the second program code of the second non-volatile memory; so that the program code for starting the computer system is updated the next time the computer system is restarted even without the previous occurrence of an error.

In the following paragraphs, exemplary embodiments of the computer system and methods are described in connection with the figures.

FIG. 1 shows a computer system 1 having a processor 2, a first non-volatile memory 3 and a system monitoring module 4. The system monitoring module 4 monitors, inter alia, the operation of the processor 2.

When the computer system 1 is started, the processor 2 executes first program code 5 which is stored in the first non-volatile memory 3. In addition, the first non-volatile memory 3 stores program code for a bootblock 6. The program code of the bootblack 6 is executed first of all when the computer system 1 is started and also comprises an integrity check for the first program code 5 in the exemplary embodiment.

The system monitoring module 4 comprises a second non-volatile memory 7 (e.g., ROM or flash module) which stores second program code 8 for starting the computer system 1. The second program code 8 may be, for example, a redundant copy of the first program code 5, a version of the program code for starting the computer system 1 which was originally delivered with the computer system 1 or an updated version of the program code.

If it is detected when starting the computer system 1 that there is a serious error (e.g., because the program code of the bootblock 6 detects that the first program code 5 is defective or because the system monitoring module 4 determines that the processor 2 does not begin to execute an operating system after a predetermined period of time) the system monitoring module 4 copies the second program code 8 of the second non-volatile memory 7 into the first non-volatile memory 3.

To this end, the computer system 1 comprises a programming device 9 which can be used to overwrite the first non-volatile memory 3 and, in particular, the first program code 5 stored in the latter. For example, the first non-volatile memory 3 is a so-called flash module which can be written to using a programming voltage generated by the programming device 9.

In order to determine whether it is necessary to update the first program code 5 using the programming device 9, the computer system 1 additionally comprises a recovery indicator 18 which can be accessed by the system monitoring module 4. The recovery indicator 18 may be formed, for example, in the first or second non-volatile memory 3 or 7 or, as illustrated in FIG. 1, may be independent of the latter. For example, an electrical switch or a software instruction may also be used to manually initiate updating of the first program code 5.

In order to also make it possible to program the first non-volatile memory 3 independently of the system monitoring module 4, the programming device 9 is additionally connected to an interface 10 which can likewise be used to provide program code for starting the computer system 1. The interface 10 may be, for example, a USB interface or an interface for connecting a floppy disk drive, which can be used to manually load program code for starting the computer system 1 into the computer system 1.

However, in order to also make it possible to maintain the computer system 1 remotely, the computer system 1 additionally has a network interface 11 which is used to connect the computer system 1 to a remote maintenance system 13 via a network 12. In the exemplary embodiment illustrated, the remote maintenance system 13 comprises a database 14 containing program code for starting the computer system 1. For example, the database 14 may be a database of a computer manufacturer or a maintenance firm, which holds a plurality of different program codes for starting different computer systems 1.

In the exemplary embodiment, the computer system 1 comprises a power supply unit 15 which supplies all of the components of the computer system 1 with an operating voltage via a first connection 16 of the power supply unit 15 in a normal operating mode. However, only the system monitoring module 4 and the network interface 11 are supplied with an operating voltage via a second connection 17 of the power supply unit 15 in a so-called standby mode.

This ensures that the second program code 8 stored in the second non-volatile memory 7 can be updated by the remote maintenance system 13 even when the computer system 1 is switched off. The updated second program code 8 is thus available the next time the computer system 1 is switched on.

Figure 2:
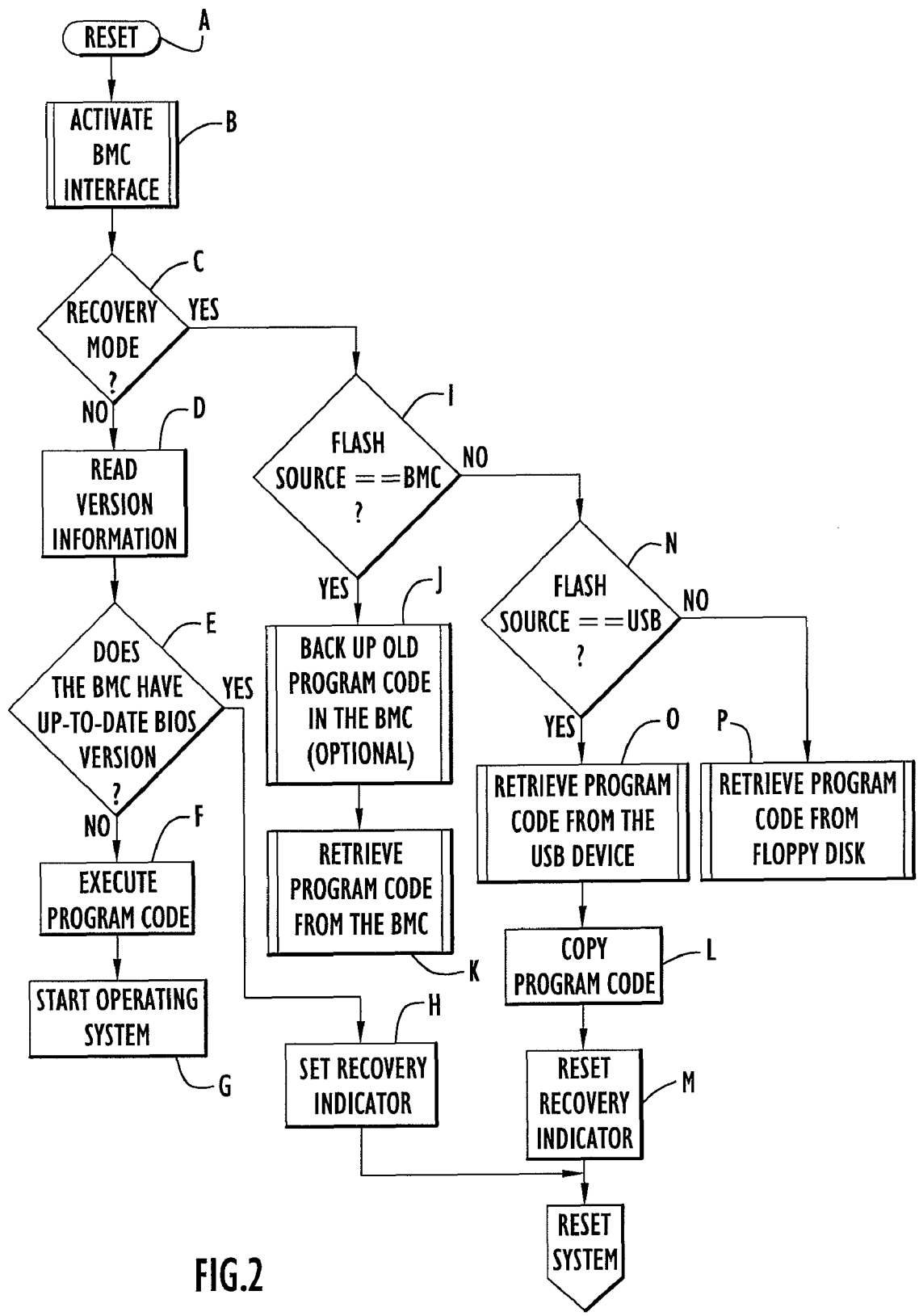
FIG. 2 shows a flowchart of a method for updating program code.

The operation of updating the program code for starting the computer system 1 is described in more detail below using the flowchart shown in FIG. 2.

In a first step A, the computer system 1 is reset. This may be, for example, a so-called reset caused by the hardware or software or may be the process of switching on the computer system 1.

In a step B, a monitoring interface of the system monitoring module 4 is activated. For example, the system monitoring module 4 detects that the power supply unit 15 has been switched to an operating mode and the processor 2 is thus supplied with an operating voltage.

In the exemplary embodiment, the system monitoring module 4 checks, in a step C, whether it is in a so-called recovery mode. This may be carried out, for example, by interrogating a recovery indicator 18 in the first non-volatile memory 3 or the second non-volatile memory 7. Alternatively, it is also possible for this check to be carried out by program code of the bootblock 6 during execution by the processor 2.

If the computer system 1 is not in the recovery mode, version information of the first program code 5 and of the second program code 8 is read in a subsequent step D. The information may be stored, for example, at a respective predetermined address of the first and/or second non-volatile memory 3 and/or 7.

In a subsequent step E, the items of version information which have been read in are compared with one another. In this case, both date information and other information may be compared with one another, so that it can be ensured that the first and/or second program code 5 and/or 8 is/are compatible with the computer system 1.

If the first program code 5 stored in the first non-volatile memory 3 is up-to-date, starting of the computer system 1 is continued in a step F by executing the first program code 5 from the first memory 3. In this case, further so-called POST (Power On Self Test) routines are executed, for example.

An operating system for execution on the computer system 1 is then started in a step G. Starting the operating system allows the monitoring module 4 to detect that the computer system 1 has been started without any serious errors.

However, if step E detects that a more up-to-date version of the program code for starting the computer system 1 than that in the first non-volatile memory 3 is stored in the second non-volatile memory 7, the system monitoring module 4 sets the recovery indicator 18 in a step H, so that the computer system 1 is in the recovery mode when it is subsequently restarted.

If this is detected in step C, a subsequent step I checks whether the system monitoring module 4 has been selected as the source for updating the first non-volatile memory 3. For example, this may be a setting which is stored in the first non-volatile memory 3 or the second non-volatile memory 7.

If the system monitoring module 4 has been selected as the source for updating, for example, because an updated second program code 8 was previously transmitted from a remote maintenance system 13 to the second non-volatile memory 7, the existing first program code 5 is first of all backed up in the second non-volatile memory 7 in an optional step J. The fact of whether the optional step J is carried out depends, in particular, on the storage capacity of the second non-volatile memory 7. Backing up the first program code 5 is particularly appropriate when there is sufficient free memory in the second non-volatile memory 7 to hold a plurality of versions of the program code for starting the computer system 1.

In a step K, the second program code 8 for starting the computer system 1 is retrieved from the second non-volatile memory 7. This may be, for example, a version of the program code which has just been updated using the remote maintenance system 13 or an old functional version that is stored in the second non-volatile memory 7. If a plurality of different versions of the second program code is stored in the second memory 7, a version to be used can be selected automatically or can be selected by a user.

In a step L, the version of the second program code 8 retrieved in step K is copied into the first non-volatile memory 3. To this end, in the exemplary embodiment, the second program code 8 is transmitted to the programming device 9 which, for its part, overwrites the first program code 5 with the second program code 8. The bootblack 6 of the first non-volatile memory 3 remains unaffected by this.

In a further step M, the recovery indicator 18 is reset, so that, after the computer system 1 has been restarted again, step C detects that the first program code 5 for starting the computer system has been successfully recovered.

If step I detected that the system monitoring module 4 is not intended to be used as the source for updating the first non-volatile memory 3, a step N checks whether the interface 10 (e.g., a USB interface in the exemplary embodiment) is intended to be used as the source.

If so, program code for updating the first non-volatile memory 3 is received from a USB storage device in a step O. The program code replaces the first program code 5 of the first non-volatile memory 3 by being copied into the latter in step L. Step M is also carried out in order to reset the recovery indicator 18.

Otherwise, that is to say if another source was detected in step N, program code is requested from another source (e.g., a floppy disk drive) in a step P and is copied into the first non-volatile memory 3 in step L before the recovery indicator 18 is reset in step M.

Alternatively, other measures for updating the first non-volatile memory 3 may also be carried out. For example, in special cases, it may be necessary to replace the first non-volatile memory 3 with another memory module.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A computer system, comprising:
a processor for executing program code;
a first non-volatile flash memory for storing first program code for starting the computer system; and
a Baseboard Management Controller configured to monitor the computer system for occurrence of a predetermined condition, the Baseboard Management Controller comprising a second non-volatile flash memory for storing second program code for starting the computer system;
wherein the Baseboard Management Controller is configured to copy the second program code into the first non-volatile flash memory in the event that the predetermined condition occurs, such that the second program code replaces the first program code and is available for subsequent starting of the computer system.

2. The computer system according to claim 1, wherein the first non-volatile flash memory further comprises an unchangeable memory area configured to store program code for a bootblock, the computer system being configured to execute the program code of the bootblock before executing the first or second program code in response to the computer system being started.

3. The computer system according to claim 2, wherein the program code of the bootblock includes an integrity check for the first program code, the computer system being configured to execute the first program code in the event the integrity check is successful and, in the event the integrity check is unsuccessful, to copy the second program code into the first non-volatile flash memory and to execute the second program code.

4. The computer system according to claim 3, wherein:
at least one of the first and second non-volatile flash memories is configured to store version information of the first and second program codes; and
in the event that the second program code is more up-to-date than the first program code, the Baseboard Management Controller is configured to copy the second program code into the first non-volatile flash memory upon the computer system being started.

5. The computer system according to claim 3, further comprising:
a network interface coupled to the Baseboard Management Controller, wherein the Baseboard Management Controller is configured to store program code received via the network interface in the second non-volatile flash memory as the second program code.

6. The computer system according to claim 5, further comprising:
a power supply unit operable in a standby mode to supply at least the Baseboard Management Controller and the network interface with an operating voltage so that the second program code can be updated in the standby mode.

7. The computer system according to claim 2, wherein:
at least one of the first and second non-volatile flash memories is configured to store version information of the first and second program codes; and
in the event that the second program code is more up-to-date than the first program code, the Baseboard Management Controller is configured to copy the second program code into the first non-volatile flash memory upon the computer system being started.

8. The computer system according to claim 2, further comprising:
a network interface coupled to the Baseboard Management Controller, wherein the Baseboard Management Controller is configured to store program code, received via the network interface, in the second non-volatile flash memory as the second program code.

9. The computer system according to claim 8, further comprising:
a power supply unit operable in a standby mode to supply at least the Baseboard Management Controller and the network interface with an operating voltage so that the second program code can be updated in the standby mode.

10. The computer system according to claim 1, wherein:
one of the first and second non-volatile flash memories is configured to store version information of the first and second program codes; and
in the event that the second program code is more up-to-date than the first program code, the Baseboard Management Controller is configured to copy the second program code into the first non-volatile memory upon the computer system being started.

11. The computer system according to claim 1, further comprising:
a network interface coupled to the Baseboard Management Controller, wherein the Baseboard Management Controller is configured to store program code, received via the network interface, in the second non-volatile flash memory as the second program code.

12. The computer system according to claim 1, wherein the Baseboard Management Controller is configured to monitor the operation of the processor.

13. The computer system according to claim 12, wherein:
the predetermined condition comprises a determination of the Baseboard Management Controller that the processor does not begin to execute an operating system after a predetermined period of time.

14. A computer system, comprising:
a processor for executing program code;
a first non-volatile memory for storing first program code for starting the computer system;
a system monitoring module configured to monitor the computer system for occurrence of a predetermined condition, the system monitoring module comprising a second non-volatile memory for storing second program code for starting the computer system;
a network interface coupled to the system monitoring module, wherein the system monitoring module is configured to store program code, received via the network interface, in the second non-volatile memory as the second program code; and
a power supply unit operable in a standby mode to supply at least the system monitoring module and the network interface with an operating voltage so that the second program code can be updated in the standby mode;
wherein the system monitoring module is configured to copy the second program code into the first non-volatile memory in the event that the predetermined condition occurs, such that the second program code replaces the first program code and is available for subsequent starting of the computer system.

15. The computer system according to claim 14, wherein:
the first non-volatile memory further comprises an unchangeable memory area configured to store program code for a bootblock, the computer system being configured to execute the program code of the bootblock before executing the first or second program code in response to the computer system being started.

16. The computer system according to claim 15, wherein:
the program code of the bootblock includes an integrity check for the first program code, the computer system being configured to execute the first program code in the event the integrity check is successful and, in the event the integrity check is unsuccessful, to copy the second program code into the first non-volatile memory and to execute the second program code.

17. The computer system according to claim 14, wherein:
at least one of the first and second non-volatile memories is configured to store version information of the first and second program codes; and
in the event that the second program code is more up-to-date than the first program code, the system monitoring module is configured to copy the second program code into the first non-volatile memory upon the computer system being started.

18. A method for updating program code for starting a computer system including a processor, a first non-volatile flash memory, and a Baseboard Management Controller with a second non-volatile flash memory, the method comprising:
executing, via the processor, program code of a bootblock from the first non-volatile flash memory;
determining whether a predetermined condition has been satisfied;
executing, via the processor, a first program code to start the computer system from the first non-volatile flash memory in the event that the predetermined condition has not been satisfied; and
copying a second program code to start the computer system from the second non-volatile memory into the first non-volatile flash memory and executing the second program code in the event that the predetermined condition has been satisfied.

19. The method according to claim 18, wherein determining whether the predetermined condition has been satisfied involves checking a recovery indicator, wherein the Baseboard Management Controller sets the recovery indicator in response to an unsuccessful start of the computer system.

20. The method according to claim 19, further comprising:
transmitting updated program code to the Baseboard Management Controller;
storing the updated program code in the Baseboard Management Controller as the second program code; and
setting the recovery indicator.

21. A computer program for a computer system including: first program code stored in a first non-volatile flash memory and intended to start the computer system; and a Baseboard Management Controller, wherein the following steps are carried out when the computer program is executed by a data processing unit of the Baseboard Management Controller:
recognizing that a non-rectifiable error has occurred during execution of the first program code; and
copying into the first non-volatile flash memory a second program code which is stored in a second non-volatile flash memory of the Baseboard Management Controller and is intended to start the computer system.

* * * * *

UNITED STATES PATENT AND TRADEMARK OFFICE
CERTIFICATE OF CORRECTION

| | | |
|---|---|---|
| PATENT NO. | : 7,941,658 B2 | |
| APPLICATION NO. | : 11/846269 | |
| DATED | : May 10, 2011 | |
| INVENTOR(S) | : Wolfgang Karpa | |

It is certified that error appears in the above-identified patent and that said Letters Patent is hereby corrected as shown below:

Column 2, lines 55 and 62, replace "bootblack" with -- bootblock --;

Column 3, line 35, replace "bootblack" with -- bootblock --;

Column 4, line 16, replace "bootblack" with -- bootblock --; and

Column 6, line 32, replace "bootblack" with -- bootblock --.

Signed and Sealed this
Eighteenth Day of October, 2011

David J. Kappos
*Director of the United States Patent and Trademark Office*